United States Patent
Ippatapu (10) Patent No.: US 10,936,197 B2
(45) Date of Patent: Mar. 2, 2021

(54) PERFORMING MEMORY COPY OPERATIONS BY A PROCESSOR BY EMPLOYING A COMPRESSION HARDWARE DEVICE

(71) Applicant: EMC IP Holding Company LLC, Hopkinton, MA (US)

(72) Inventor: Venkata L. R. Ippatapu, Westborough, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 25 days.

(21) Appl. No.: 16/383,959

(22) Filed: Apr. 15, 2019

(65) Prior Publication Data

US 2020/0326860 A1    Oct. 15, 2020

(51) Int. Cl.
  *G06F 3/06*     (2006.01)
  *G06F 12/0802*  (2016.01)

(52) U.S. Cl.
  CPC .......... *G06F 3/0608* (2013.01); *G06F 3/065* (2013.01); *G06F 3/0679* (2013.01); *G06F 12/0802* (2013.01)

(58) Field of Classification Search
  CPC ...... G06F 3/0608; G06F 3/065; G06F 3/0679; G06F 12/0802
  See application file for complete search history.

(56) References Cited

U.S. PATENT DOCUMENTS

| | | | | |
|---|---|---|---|---|
| 5,394,534 A | * | 2/1995 | Kulakowski | G06F 3/0601 711/112 |
| 9,385,749 B1 | * | 7/2016 | Nam | H03M 7/607 |
| 10,521,317 B1 | * | 12/2019 | Ippatapu | H03M 7/6047 |
| 2004/0049649 A1 | * | 3/2004 | Durrant | G06F 9/30032 711/165 |
| 2012/0131293 A1 | * | 5/2012 | Benhase | G06F 3/065 711/162 |
| 2016/0202927 A1 | * | 7/2016 | Klarakis | G06F 3/0665 709/217 |

* cited by examiner

*Primary Examiner* — Francisco A Grullon
(74) *Attorney, Agent, or Firm* — Amin, Turocy & Watson, LLP (57) ABSTRACT

The described technology is generally directed towards performing memory copy operations. According to an embodiment, a system can comprise a memory that stores computer executable components, a compression component, and a processor that can execute the computer executable components stored in the memory. The computer executable components comprise an instruction decoder that can receive an instruction from a host application, resulting in a decoded instruction. The components can also comprise a compression component controller to control the compression component, and a memory copier to employ the compression component controller to control the compression component to copy the value from the first memory location to a second memory location in the second memory, in accordance with the decoded instruction.

20 Claims, 10 Drawing Sheets

PERFORMING MEMORY COPY OPERATIONS BY A PROCESSOR BY EMPLOYING A COMPRESSION HARDWARE DEVICE

TECHNICAL FIELD

The subject application generally relates to microprocessor operations, and, for example, to memory copy operations, and related embodiments.

BACKGROUND

The performance of memory copy commands can, in some circumstances, be a significant factor in the performance of a software system. Memory operations, including those that can perform memory operations on blocks of memory, like memcpy, are generally synchronous, blocking I/O operations, which rely on thread-based concurrency, e.g., every thread allocated uses up resources, more context switching will happen between them than with other types of operations, and the OS has a maximum number of threads. Further, if data to be copied is not already cached memory copying operations, such as memcpy, can become highly inefficient, e.g., because program execution is paused until the data is fetched onto the cache registers. This can be further aggravated by varying size data packets received from a network being pointed to by data to be copied. In addition, copying network packet data from memory can be difficult because this data can be scattered and distributed anywhere in a host memory while being received from the network. Even in other circumstances with different execution characteristics, e.g., asynchronous and/or non-blocking, memory copy commands can divert processing resources from other important activities performed by application threads.

Based at least on these characteristics of the execution of memory copy commands, in some host applications, these commands can be highly Central Processing Unit (CPU) expensive and consume more computational cycles than other types of operations.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can comprise a memory that stores computer executable components, a compression component, and a processor that can execute the computer executable components stored in the memory. The computer executable components comprise an instruction decoder that can receive an instruction from a host application, resulting in a decoded instruction. The components can also comprise a compression component controller that can control the compression component, and a memory copier to employ the compression component controller to control the compression component to copy the value from the first memory location to a second memory location in the second memory, in accordance with the decoded instruction.

According to another embodiment, a computer-implemented method can comprise receiving, by a compression component comprising a first processor, from a second processor, an instruction from a host application to copy a value from a first memory location to a second memory location in a memory coupled to the second processor. The method can further comprise copying, by the compression component, the value from the first memory location to the second memory location, in accordance with the instruction. The method can further comprise communicating, by the compression component, a result of the copying to the second processor.

According to another embodiment, a computer program product is provided. The computer program product can comprise machine-readable storage medium comprising executable instructions that, when executed by a processor, facilitate performance of operations comprising receiving an instruction from a host application, resulting in a decoded instruction, and controlling a compression component to copy a value from a first memory location to a second memory location, in accordance with the decoded instruction.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements, and in which.

DETAILED DESCRIPTION

Various aspects described herein are generally directed to facilitating memory copy operations by a processor by employing a compression component. As will be understood, the implementation(s) described herein are non-limiting examples, and variations to the technology can be implemented.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

The computer processing systems, computer-implemented methods, apparatus and/or computer program products described herein employ hardware and/or software to solve problems that are highly technical in nature (e.g., reconfiguring hardware, accessing memory locations), that are not abstract and cannot be performed as a set of mental acts by a human. For example, a human, or even a plurality of humans, cannot efficiently, accurately and effectively, manually perform multithreaded memory operations to manipulate data with the same level of accuracy and/or efficiency as the various embodiments described herein.

Figure 1:
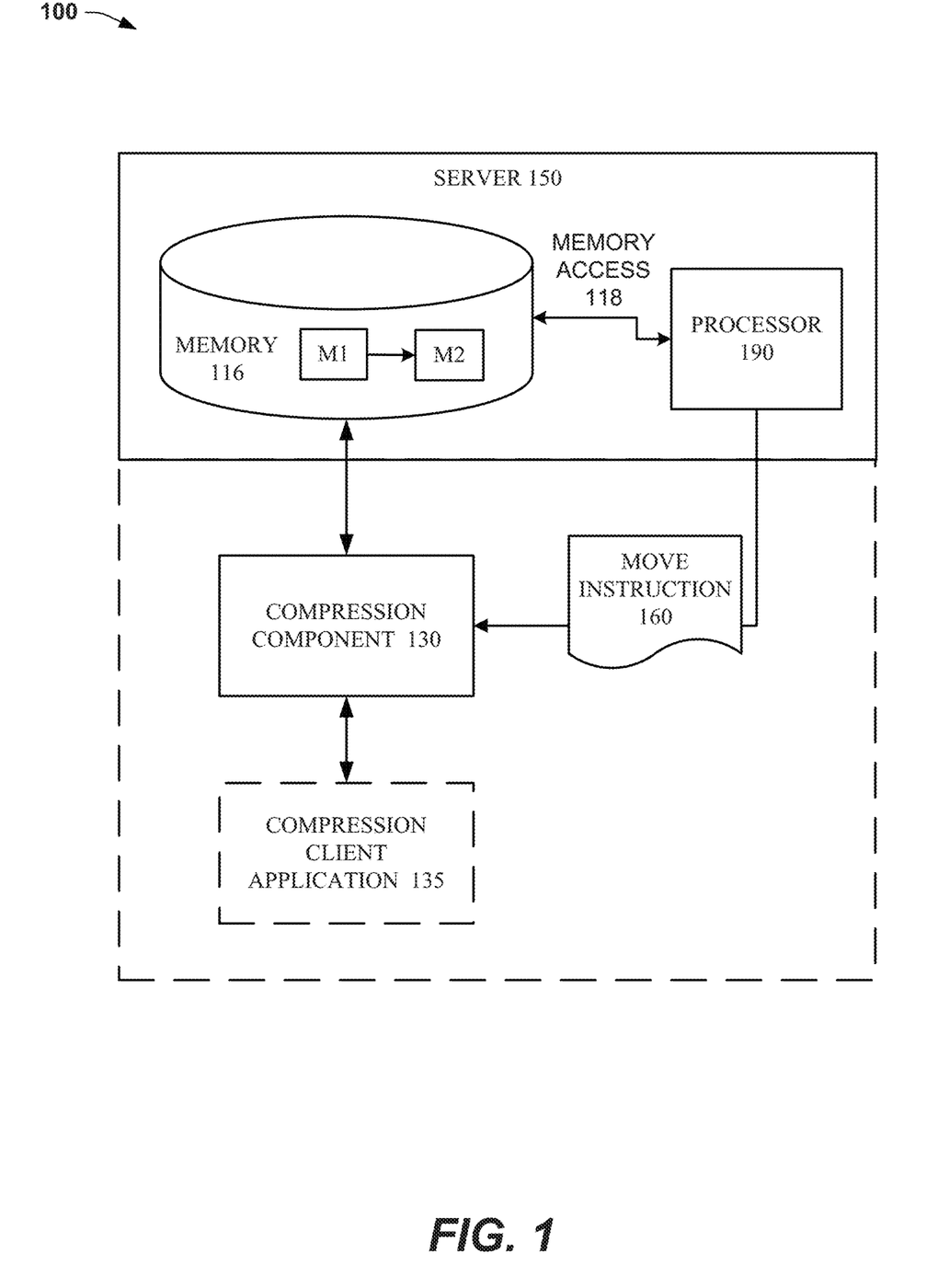
FIG. 1 illustrates a block diagram of an example, non-limiting system that can facilitate memory copy operations by a processor by employing a compression hardware device, in accordance with various aspects and implementations of the subject disclosure.

FIG. 1 illustrates a block diagram of an example, non-limiting system 100 that can facilitate memory copy operations by a processor by employing compression component 130, in accordance with various aspects and implementations of the subject disclosure.

In one or more embodiments, system 100 includes a server 150, which can have memory 116 and a processor 190. Compression component 130 is coupled to processor 190, and can provide compression functions that can offer a range of benefits including, but not limited to storage capacity savings increased network transmission speed. As depicted, compression component 130 can be a part of server 150, or can be independent but accessible by processor 190. Compression component can also be used by other hardware devices, including compression client application 135, which can also use functions provided by compression component 130.

It should be noted that compression component 130 can be a device with a separate processor (not shown), with computer-executable components customized with algorithms that can provide compression functions, e.g., implemented in combination of hardware and software to provide the functions of compression component 130 described herein.

An example system that can use an instance of compression component 130 is a storage system that can facilitate data replication, data backup, and data recovery. Generally speaking, storage Systems can copy host data from data servers to local storage or to primary and secondary storage located in different geographical locations, e.g., for disaster recovery and fault tolerance. The data storage systems can be connected in a variety of ways, including but not limited to, employing an Ethernet network. Storage systems can have compression capable components that are used to enable applications to compress data. Replication systems, a type of storage system, can also use a compression component to compress replication data to reduce the network bandwidth usage.

An example of a storage system that can employ various features described herein, is the VMAX All Flash® system provided by DELL EMC. In some implementations of VMAX, a compression component 130 that can include software and hardware elements can be used to improve storage capacity, e.g., the VMAX Adaptive Compression Engine (ACE) provided by DELL EMC. Other types of direct connections to storage processor and data mover components are also available, e.g., Asteroid Compression Hardware based on the XR8204 Compression Coprocessor provided by Exar, Corp.

In another example of the use of system 100 described below, processor 190 can perform a memory operation that is unrelated to the operation of compression component 130, e.g., an operation to copy a value from a first memory location M1 to a second memory location M2, e.g. a block memory copy operation such as memcpy.

In one or more embodiments processor 190 can provide a move instruction 160 to compression component 130, and this component can access memory 116 and perform the memory copy operation, avoiding the above described access to memory 116 by processor 190, and moving a value at memory location M1 to memory location M2. As described in more detail with FIGS. 2-6 below, one or more embodiments can signal compression component 130 to only perform a memory copy operation which can temporarily disable certain functions of compression component 130, and use compression component 130 to directly access a value in the first memory location and copy the value to a second memory location.

In some embodiments, processor 190 can comprise one or more of a central processing unit, multi-core processor, microprocessor, dual microprocessors, microcontroller, System on a Chip (SOC), array processor, vector processor, and/or another type of processor. Further examples of processor 190 are described below with reference to processing unit 1014 and FIG. 10. Such examples of processor 190 can be employed with any embodiments of the subject disclosure.

As discussed further below with FIG. 10, in some embodiments, memory 116 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 116 are described below with reference to system memory 1016 and FIG. 10. Such examples of memory 116 can be employed to implement any embodiments of the subject disclosure. It should also be noted that, as described further below, memory 116 can comprise memory buffers used to pass values between components.

According to multiple embodiments, processor 160 can comprise one or more types of processors and/or electronic circuitry that can implement one or more computer and/or machine readable, writable, and/or executable components and/or instructions that can be stored on memory 116. For example, processor 160 can perform various operations that can be specified by such computer and/or machine readable, writable, and/or executable components and/or instructions including, but not limited to, logic, control, input/output (I/O), arithmetic, and/or the like.

Figure 2:
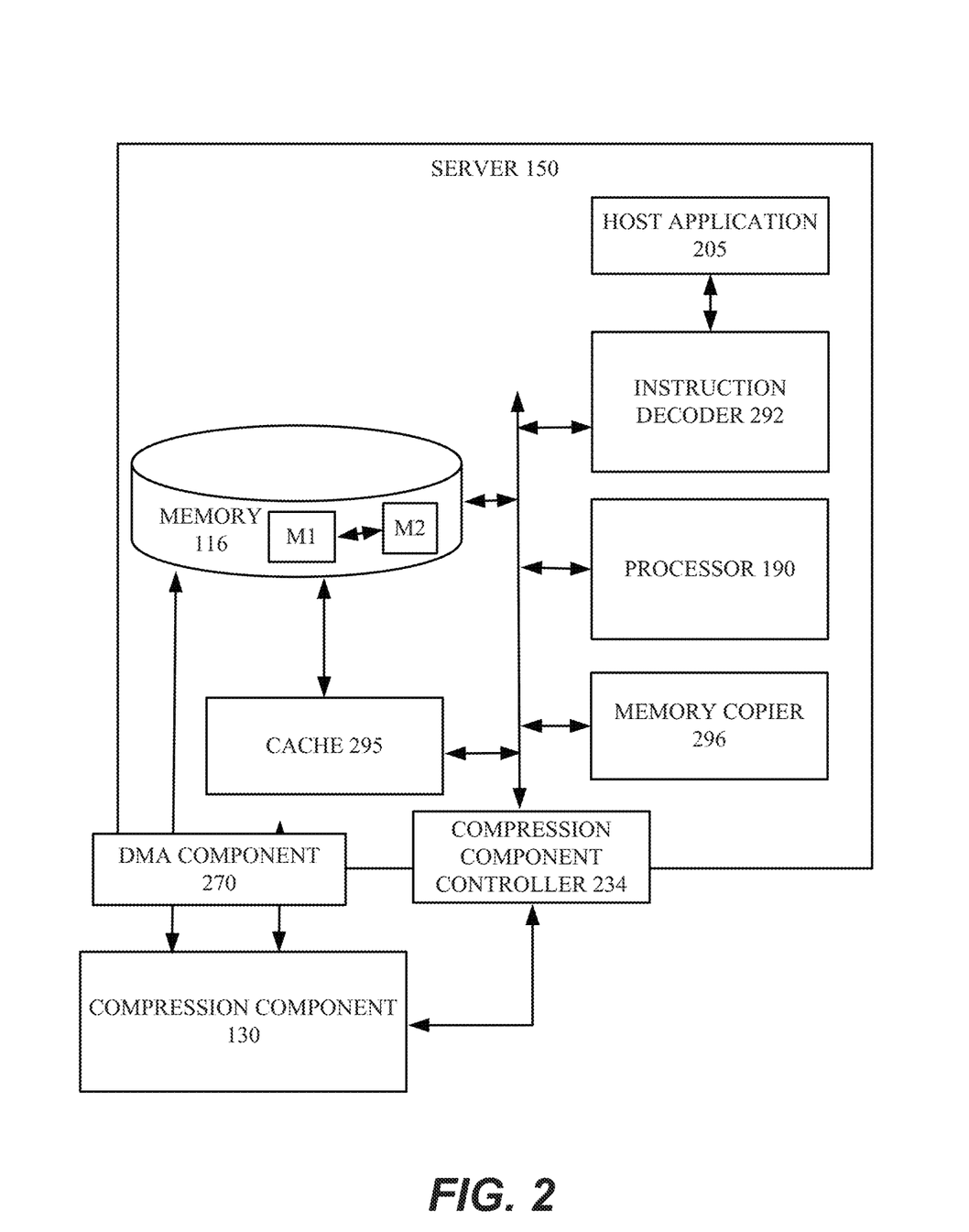
FIG. 2 illustrates a more detailed example, non-limiting system, similar to the system discussed with FIG. 1, in accordance with one or more embodiments.

FIG. 2 illustrates a more detailed example, non-limiting system 200, similar to the system discussed above with FIG. 1. For purposes of brevity, description of like elements and/or processes employed in other embodiments is omitted.

As depicted, instruction decoder 292 can receive an instruction from host application 205 to move a value from memory location M1 to memory location M2. In the example implementation depicted, processor 190 receives the instruction and, instead of accessing memory 116 directly, as described above, executes the instruction by employing memory copier 296 to interface with compression component 130 by employing compression component controller 234. In this example, the instruction from host application 205 comprises a block copy command, similar to memcpy, noted above.

An example of the approach used by compression component controller is discussed with FIG. 5 below, and after receiving the instruction from host application 205, compression component 130 can use a direct memory access (DMA) capability to retrieve a value from the specified memory location M1. In one or more embodiments, compression component 130 can have this DMA capability to enable functions for which compression component 130 is directed, e.g., retrieving one or more values from memory 116 to enable compression of the values.

Continuing this example, once retrieved from memory location M1, DMA component 270 and compression component can, instead of performing any operations on the value (e.g., compression), copy the value to memory location M2. In one or more embodiments, compression component 130 can have this DMA capability because completion queue can used alternatively by compression component 130 to output results of a function, e.g., compression. An alternative memory location to copy the value includes cache 295.

Figure 3:
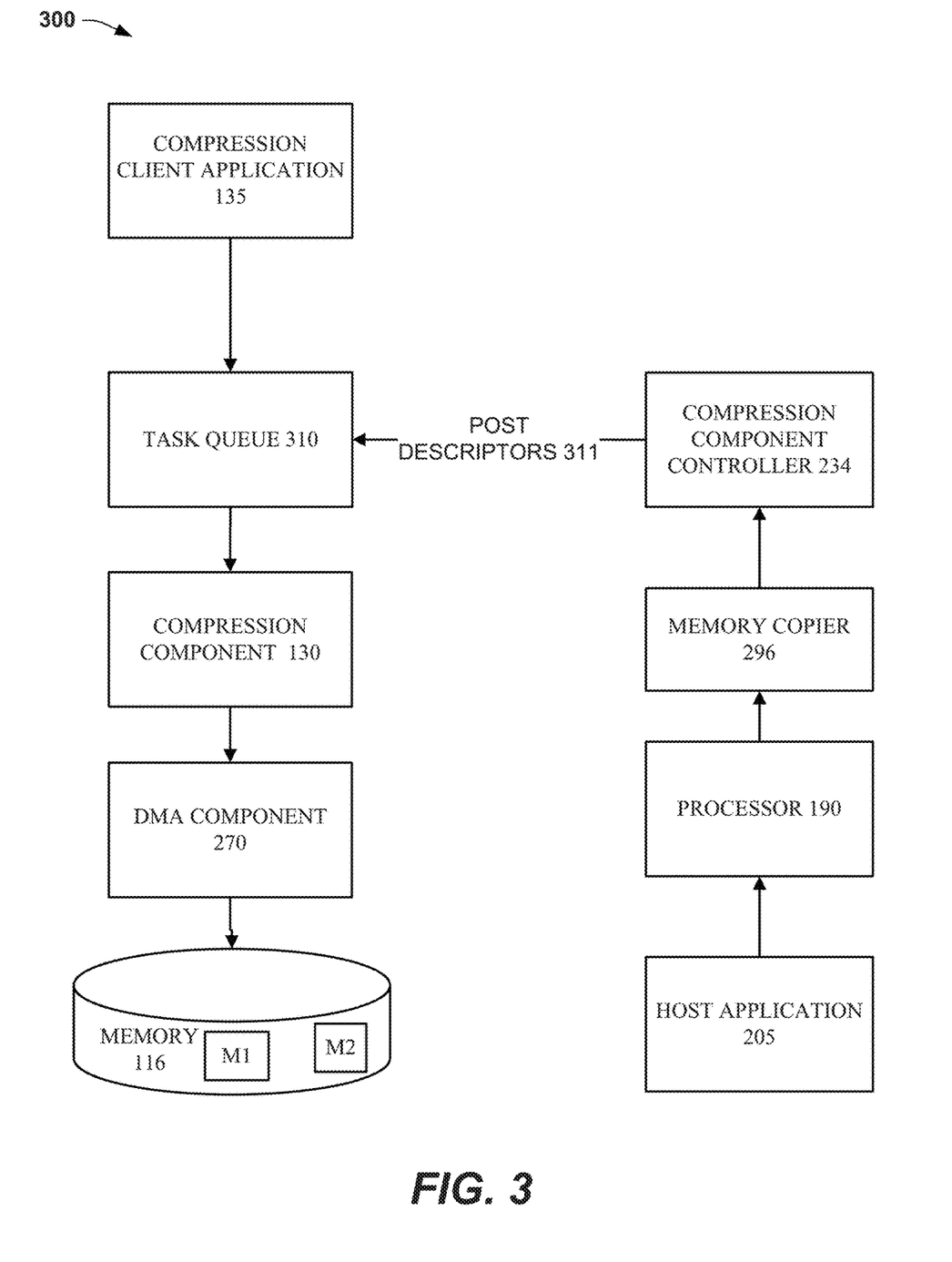
FIG. 3 illustrates an example, non-limiting flow diagram for a method that can facilitate memory copy operations by a processor by employing compression component, in accordance with one or more embodiments.

FIG. 3 illustrates an example flow diagram for a method 300 that can facilitate memory copy operations by a processor by employing compression component 130. For purposes of brevity, description of like elements and/or processes employed in other embodiments is omitted.

Method 300 begins with host application 205 instructing processor 190 to copy a value from memory location M1 to memory location M2. The example below details one approach used by processor 190 to employ memory copier 296 to convey the instruction to compression component 130.

One approach to implementing compression component controller 234 uses compression component task queue 310 to receive the instructions, e.g., using command and value descriptors 311 that can specify the memory copy command to be performed by compression component 130, including source and destination memory locations. Upon receiving the instructions, compression component can employ DMA component 270 to retrieve and store the value, as described with FIG. 2 above.

Figure 4:
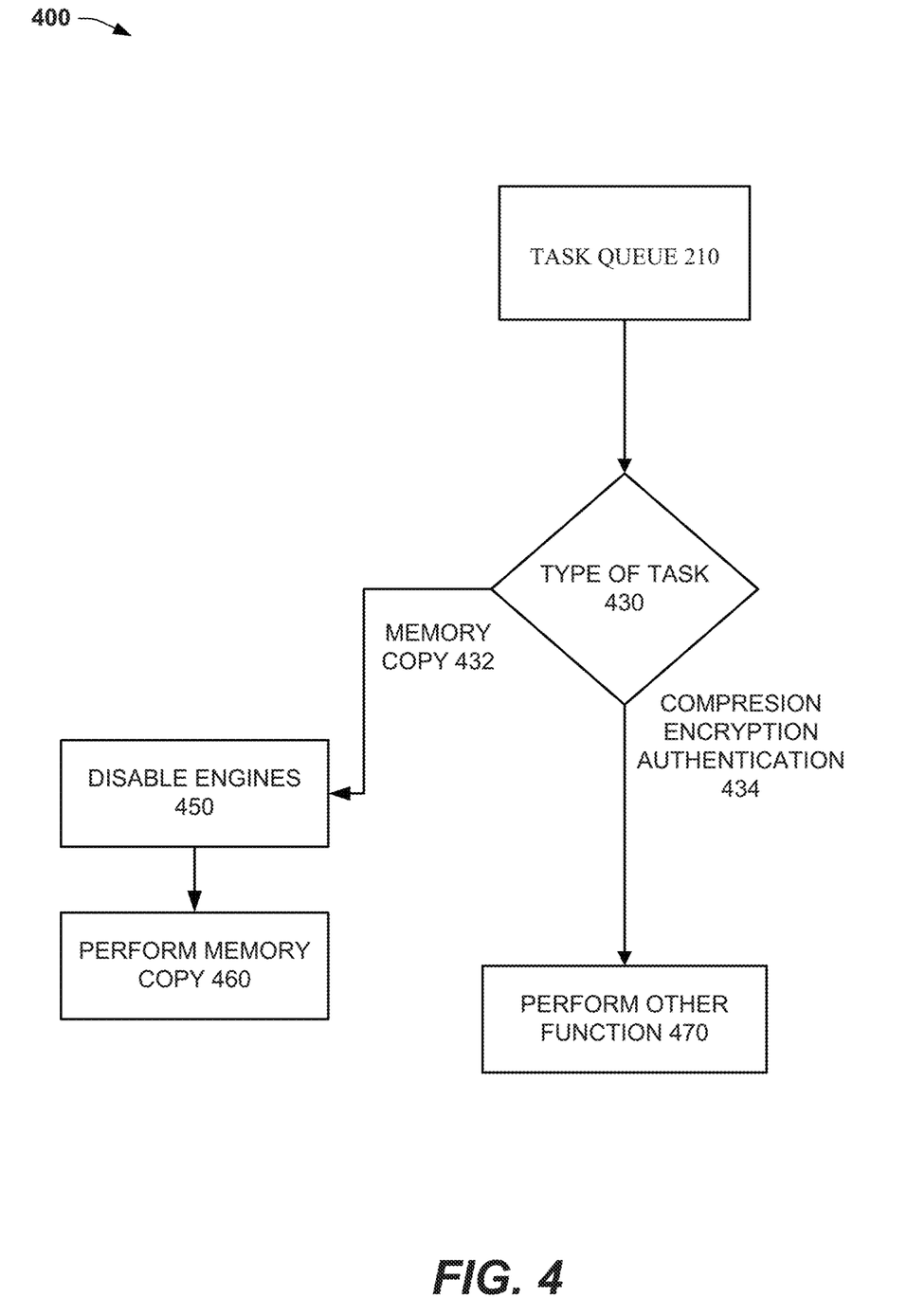
FIG. 4 depicts a flow diagram showing an example use of a compression component task queue, in accordance with one or more embodiments.

FIG. 4 depicts a flow diagram showing an example use of the compression component 130 task queue 210, in accordance with one or more embodiments. For purposes of brevity, description of like elements and/or processes employed in other embodiments is omitted.

In one or more embodiments, task queue 210 can be used by compression component 130 to receive tasks, both tasks requiring compression or another additionally supported specialized function (e.g., encryption and authentication) and tasks described herein, where a block copy command is performed by compression component 130. One approach to facilitating this dual use is to, as depicted in FIG. 4, determine, at block 430, the type of task, e.g., a task using engines of the compression component 130, e.g., compression, encryption, and authentication, or a memory copy 432 task.

When the task type is compression, encryption, or authentication 434 task, the task is performed according to the standard features of compression component 130 (although this component is specified as for compression, it should be noted that other types of functions can be performed by this component). It should be noted that, various embodiments described herein describe employing a compression component not only for data compression, but also as a way of enabling particular types of data memory copy operations not normally performed.

Figure 5:
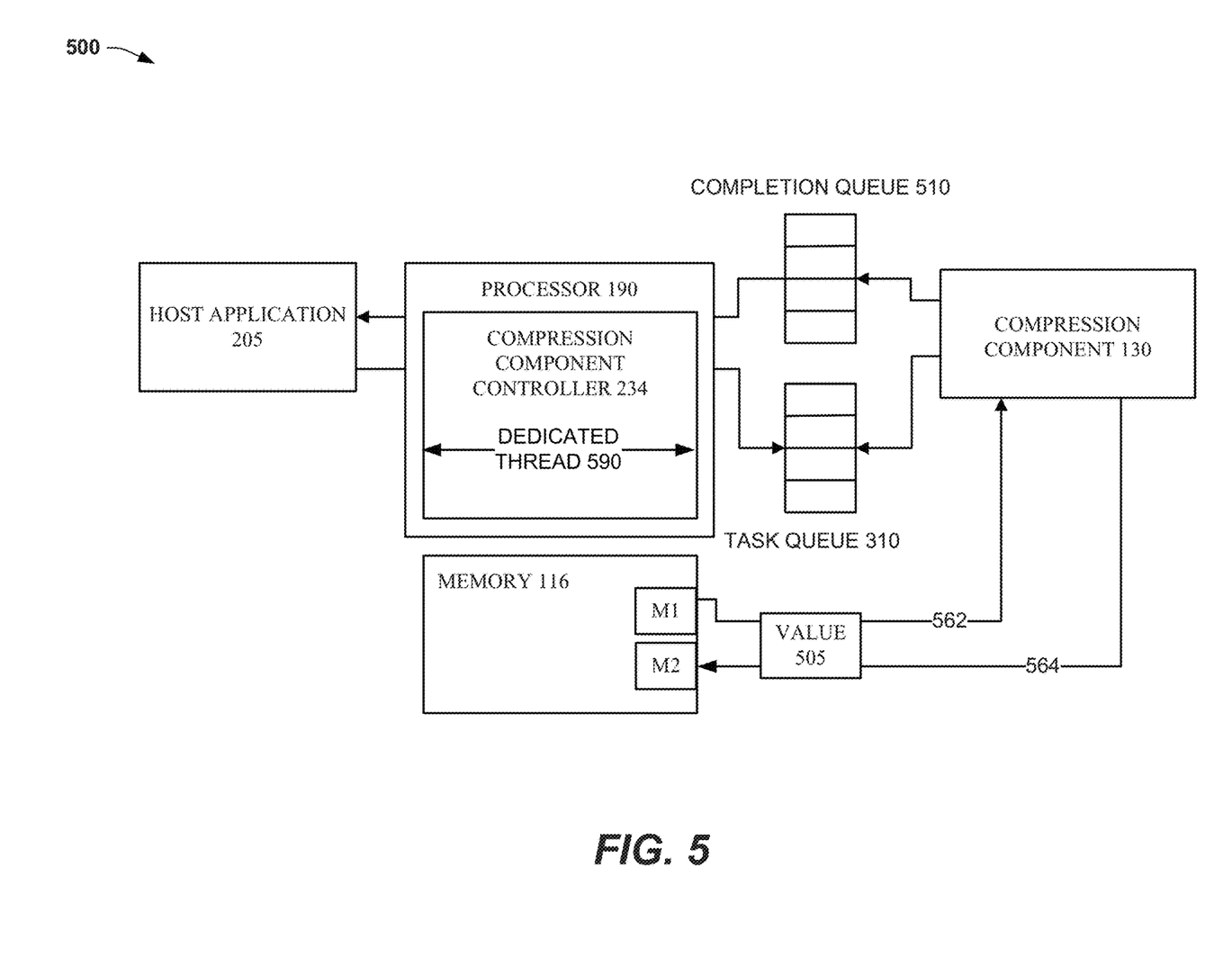
FIG. 5 illustrates a block diagram of an interface portion of a system facilitating memory copy operations by a processor by employing an compression component, in accordance with one or more embodiments.

When the task is determined to be a memory copy 432 command, one or more embodiments can temporarily disable 450 the function engines of the compression component, e.g., as depicted in FIG. 5 and discussed below, one or more of a compression engine, an encryption engine, or an authentication engine. In one or more embodiments, this disabling may improve performance of the memory copy task.

FIG. 5 illustrates a block diagram of an interface portion of a system facilitating memory copy operations by a processor by employing compression component 130, in accordance with or more embodiments. For purposes of brevity, description of like elements and/or processes employed in other embodiments is omitted.

As noted above, system 100 can include a compression component controller 234 that, for memory copy operations described above, can relay instructions to, and receive results from compression component 130. FIG. 5 depicts one approach that can be used by one or more embodiments, but it should be appreciated that other approaches can be used for this interface, without departing from the scope of the description herein.

As described above, one of the ways that compression component 130 can perform compression functions is by the use of source and destination buffers, these respectively providing source information (instructions as to what function to perform, and values for this performance) and destination information (this location being for the retrieval of the results of the instruction by the host process). In one or more embodiments, these defined source and destination buffers can be used for task queue 310 (as described above, being used to relay instructions from processor 190 to compression component 130) and a completion queue 510 for results of the block copy operations (e.g., holding results similar to the destination buffer described above). As noted above, compression component controller 234 can post descriptors in task queue 310 to store tasks (e.g., command descriptors) and task arguments (e.g., source and destination data descriptors) for execution by compression component 130.

In additional embodiments, approaches can be implemented that can further increase the performance of memory copy operations. For example, compression component controller 234, that can be used for some overhead functions, such as providing commands and receiving results, can be implemented using one or more threads of processor 190 that have been preferentially allocated. In some embodiments, this preferential allocation can be implemented using resource allocation algorithms in a task scheduler, and in other embodiments, the one or more threads can be dedicated to compression component controller (e.g., dedicated thread 590), thus reducing overhead in some circumstances, e.g., in some circumstances this offloading of the memory copy processes can render this command non-blocking, in contrast to the blocking approach described above.

One the descriptors have been posted in task queue 310, compression component 130 can parse several fields of the command structure posted by the compression component controller. Because, as described with FIG. 4 above, one or more of the engines (compression, encryption, and authentication) of compression component 130 are disabled, the source data specified by descriptors can be directly copied to the host memory destination data location specified by the descriptors. For example, as depicted, value 505 can be copied 562 from memory location M1, and subsequently stored 564 in memory location M2.

It should be noted that, in some circumstances, one or more embodiments can facilitate the copying data packets received from a network (e.g., MTU chunks) to a single destination buffer across any two storage systems. In addition, one or more embodiments can reduce the application thread computation cycles used to later process this data on multiple received data buffers.

Also, with respect to DMA operations, one or more embodiments can provide an alternate approach to using a serve an alternate solution to an execute device diagnostic command to DMA data from or to, memory 116, the application memory, or global memory.

Figure 6:
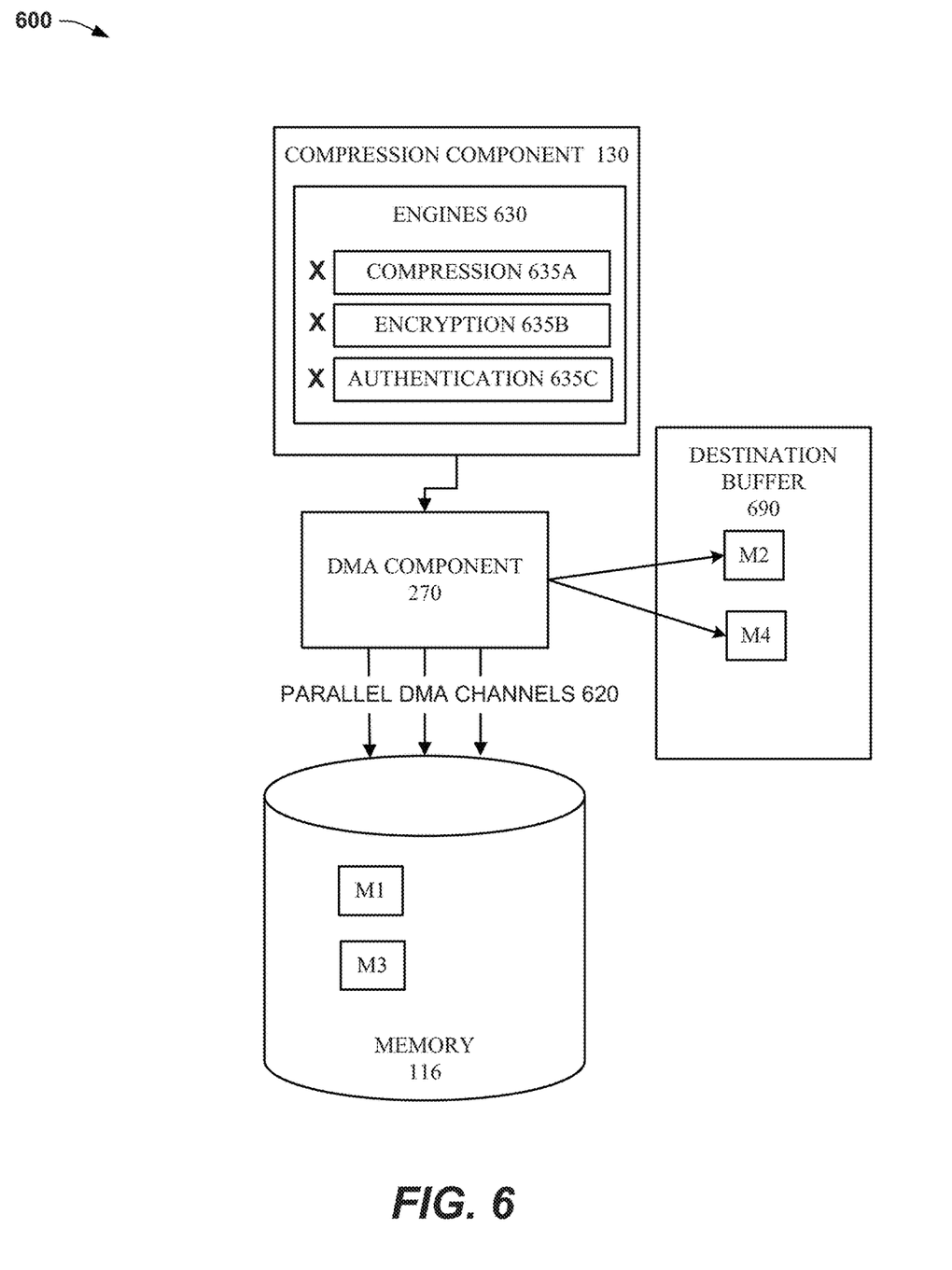
FIG. 6 illustrates another view of a system facilitating memory copy operations by a processor by employing a compression component, in accordance with one or more embodiments.

FIG. 6 illustrates another view of a system facilitating memory copy operations by a processor by employing compression component 130, in accordance with one or more embodiments. For purposes of brevity, description of like elements and/or processes employed in other embodiments is omitted.

As noted above with the description of FIG. 6, compression component 130 can use DMA component 270 to copy and store values from memory 116. In some circumstances, specialized processing devices, such as compression component 130 can have DMA component 270 capabilities that exceed the capabilities of a DMA for use by processor 190. In one or more embodiments, server 150 can have an instance of DMA component 270 with parallel DMA channels 620, e.g., accessing memory 116, in some circumstances, in parallel. Because of these parallel channels, in some circumstances compression component 130 can perform several requests at the same time, thus potentially further increasing throughput of memory copy operations performed by one or more embodiments described herein. As depicted, values in memory locations M1 and M3 are respectively copied to memory locations M2 and M4 in destination buffer 690.

As depicted in this example, engines 630 of compression component 130 can be disabled to facilitate performing a memory copy operation by the compression component, e.g., engines including, but not limited to, compression 635A, encryption 635B, and authentication 635C.

Figure 7:
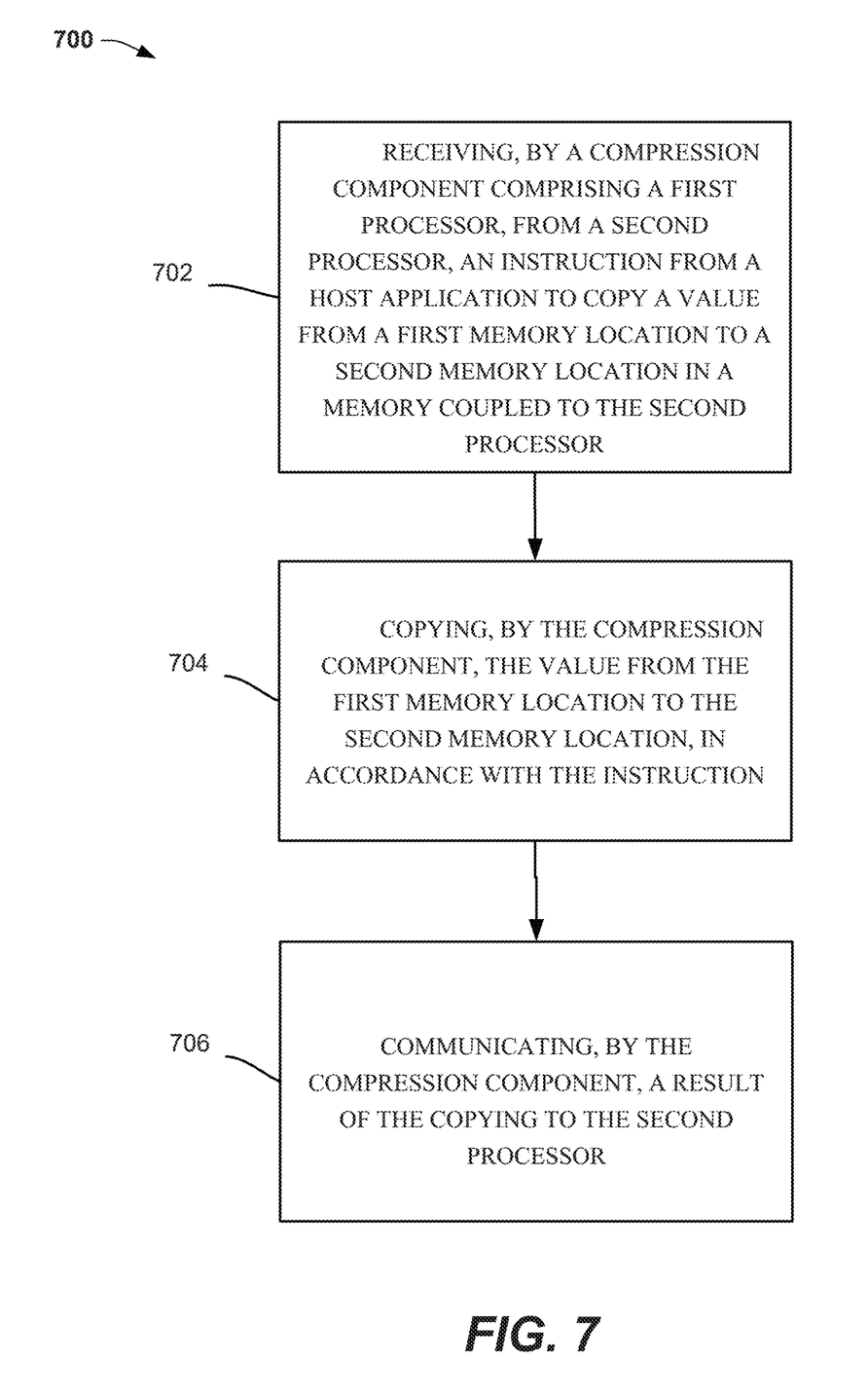
FIG. 7 illustrates an example flow diagram for a method that can facilitate performing memory copy operations by processor 190 by employing a compression hardware device, in accordance with one or more embodiments.

FIG. 7 illustrates an example flow diagram for a method 700 that can facilitate memory copy operations by a processor by employing compression component 130, in accordance with one or more embodiments. For purposes of brevity, description of like elements and/or processes employed in other embodiments is omitted.

At element 702, method 700 can comprise receiving, by a compression component 130 comprising a first processor, from a second processor 190, an instruction (e.g., a descriptor posted to task queue 310 by compression component controller 234) from host application 205 to copy a value from a first memory location M1 to a second memory location M2 in a memory 116 coupled to the second processor 190.

At element 704, method 700 can further comprise copying, by the compression component 130, value 505 from the first memory location M1 to the second memory location M2, in accordance with the instruction. At element 706, method 700 can further comprise communicating, by the compression component 130, results of the copying to the second processor 190, e.g., by storing value 505 in destination buffer 690.

Figure 8:
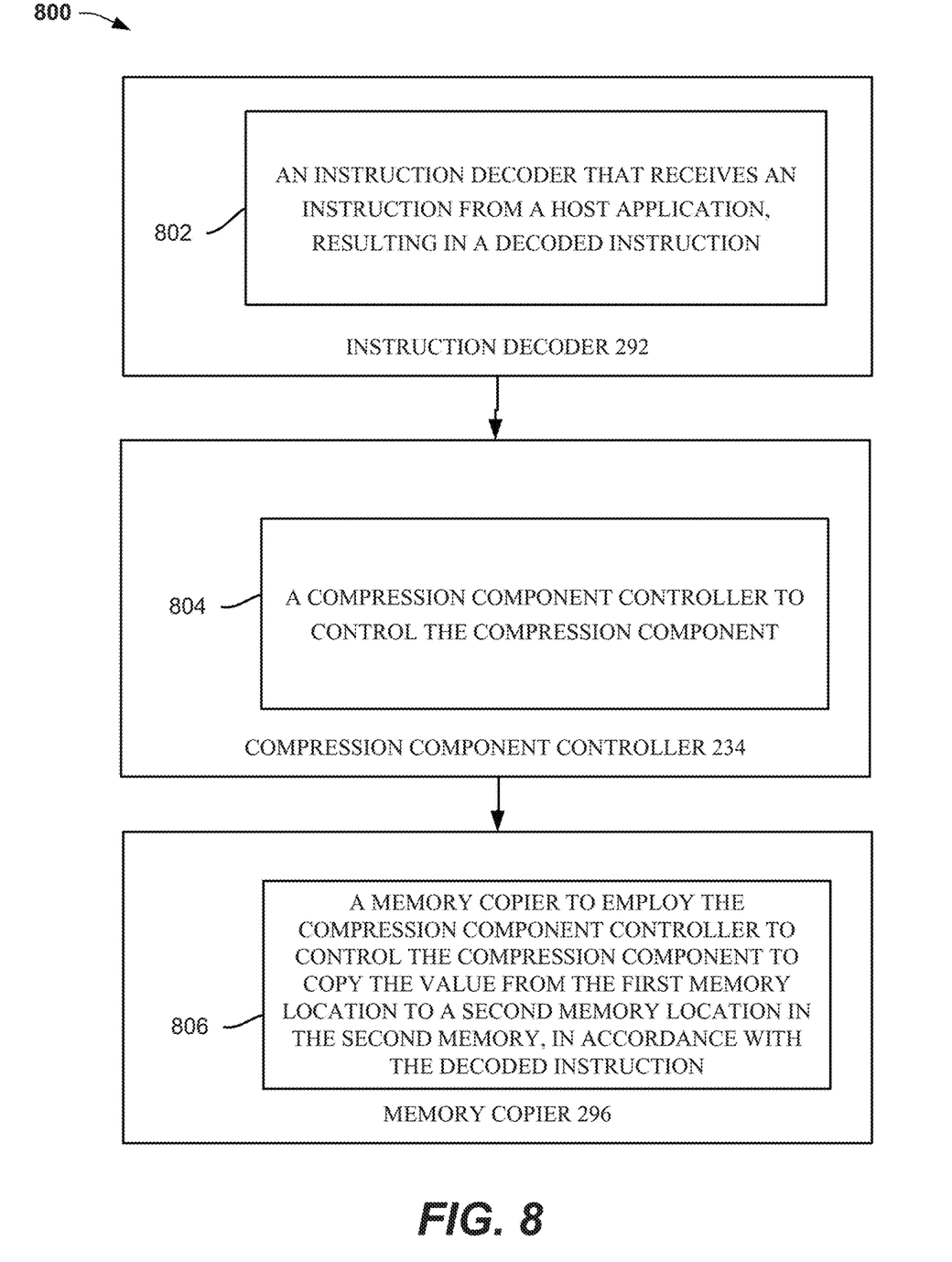
FIG. 8 is a flow diagram representing example operations of a system that can facilitate performing memory copy operations by processor 190 by employing a compression hardware device, in accordance with one or more embodiments.

FIG. 8 is a flow diagram 800 representing example operations of a system 800 facilitating memory copy operations by a processor by employing compression component 130, in accordance with one or more embodiments. For purposes of brevity, description of like elements and/or processes employed in other embodiments is omitted.

System 800 can include a compression component 130 and computer executable components that can comprise an instruction decoder 292 that can be configured 802 to receive an instruction from a host application 205, resulting in a decoded instruction. Compression component controller 234 can be configured 804 to control the compression component 130, and memory copier 296 can be configured 806 to employ compression component controller 234 to control compression component 130 to copy value 505 from the first memory location M1 in memory 116 to a second memory location M2, in accordance with the decoded instruction.

Figure 9:
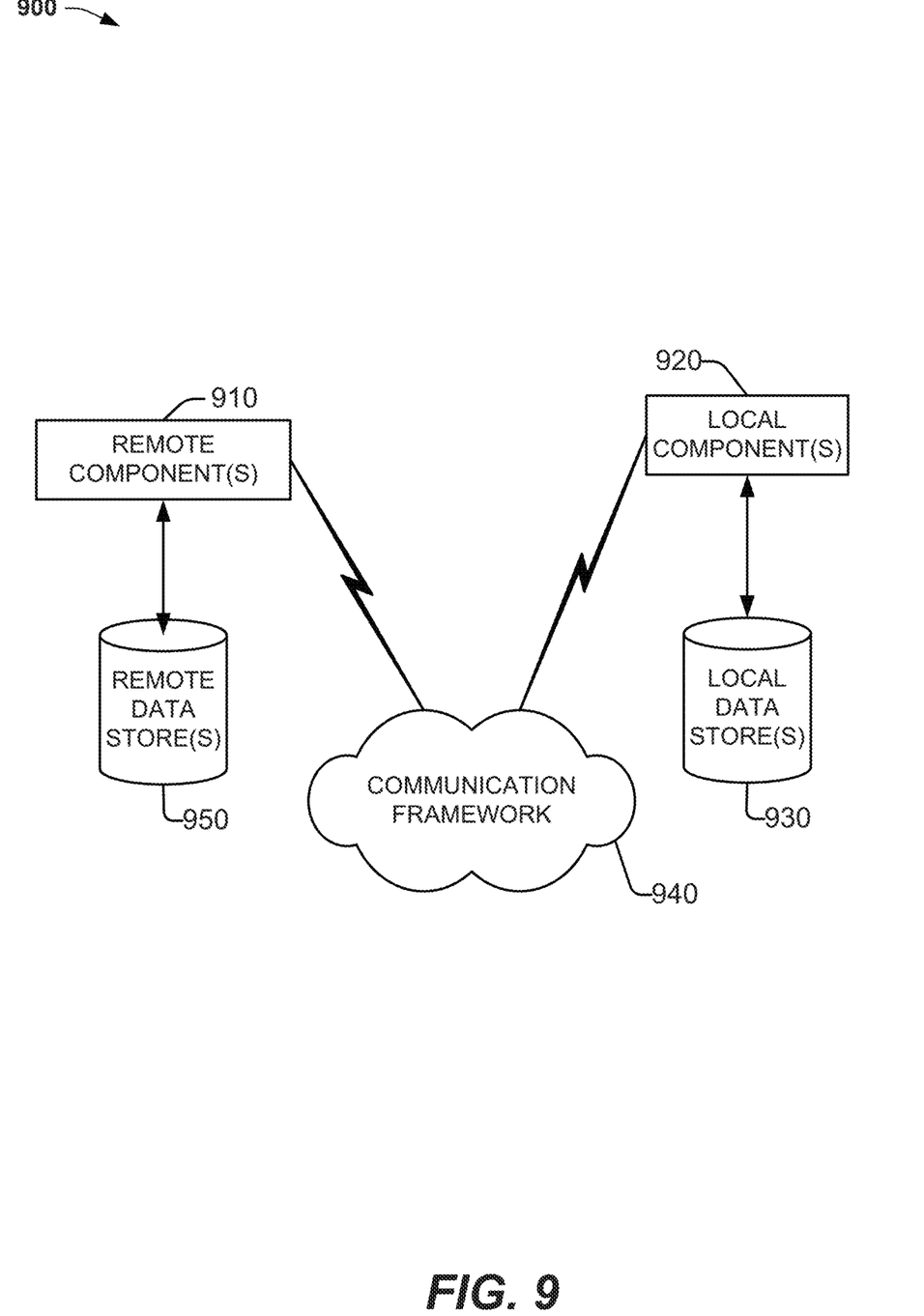
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software.

One possible communication between a remote component(s) 910 and a local component(s) 920 can be in the form of a data packet adapted to be transmitted between two or more computer processes. Another possible communication between a remote component(s) 910 and a local component (s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, FIG. 8, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, non-volatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
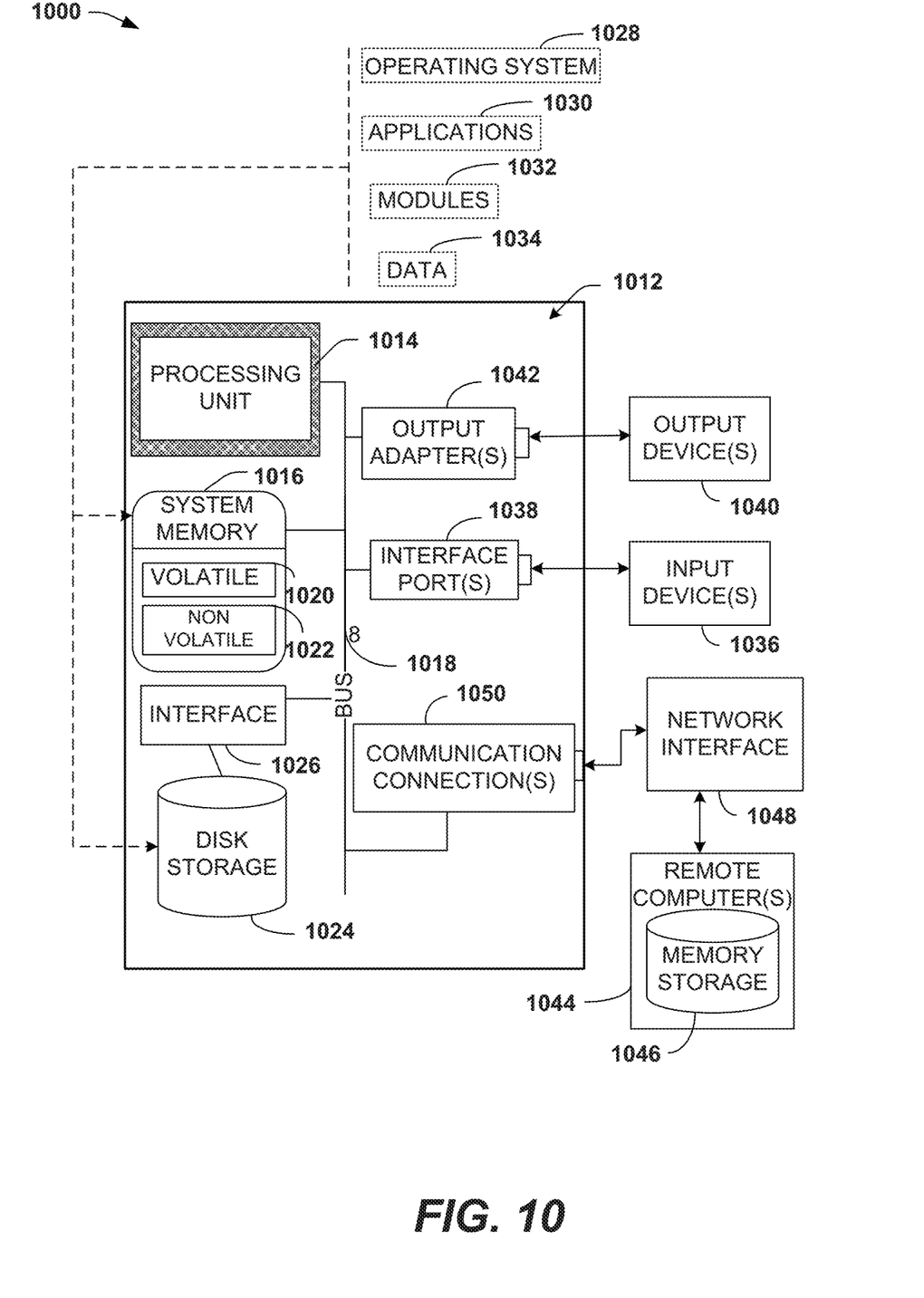
FIG. 10 illustrates an example block diagram of a computing system operable to execute the disclosed systems and methods in accordance with various aspects and implementations of the subject disclosure.

FIG. 10 illustrates a block diagram of a computing system 1000 operable to execute the disclosed systems and methods in accordance with one or more embodiments/implementations described herein. Computer 1012 can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1016 can comprise volatile memory 1020 and non-volatile memory 1022. A basic input/output system, containing routines to transfer information between elements within computer 1012, such as during start-up, can be stored in non-volatile memory 1022. By way of illustration, and not limitation, non-volatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
   a first memory that stores computer executable components,
   a second memory that stores a value at a first memory location;
   a compression component comprising a compression engine; and
   a processor that executes the computer executable components stored in the first memory, wherein the computer executable components comprise:
   an instruction decoder that receives a direct memory access memory copy instruction from a host application to copy the value from the first memory location to a second memory location in the second memory, resulting in a decoded memory copy instruction;
   a compression component controller to control the compression component; and
   a memory copier to employ the compression component controller to control the compression component to:
   disable compression capabilities of the compression engine, employ a direct memory access capability of the compression component to access the first memory location directly, and employ the direct memory access capability to copy the value from the first memory location to the second memory location, in accordance with the decoded memory copy instruction.

2. The system of claim 1, wherein the processor comprises a multithreaded processor that executes tasks by employing threads, wherein a first thread of the threads is dedicated to interfacing with the compression component controller.

3. The system of claim 2, wherein the compression component controller employs the first thread to post a descriptor to a task queue of the compression component, and wherein the compression component copies the value based on the descriptor.

4. The system of claim 1, wherein the host application predicted that the direct memory access memory copy instruction will be non-blocking based on the direct memory access memory copy instruction being performed by the direct memory access capability of the compression component, resulting in a non-blocking prediction, and wherein the instruction decoder receives the direct memory access memory copy instruction based on the non-blocking prediction.

5. The system of claim 1, wherein the second memory comprises a memory cache, and wherein at least one of the first memory location or the second memory location correspond to locations in the memory cache.

6. The system of claim 1, wherein the second memory comprises memory buffers, and wherein the first memory location comprises a source memory buffer and the second memory location comprises a destination memory buffer.

7. The system of claim 1, wherein the direct memory access capability of the compression component is different from a capability of a direct memory access component of the system.

8. The system of claim 1, wherein the system is a data protection system.

9. The system of claim 1, wherein the copying the value comprises asynchronously copying the value.

10. A method, comprising:
receiving, by a compression component comprising a first processor, from a second processor:
a first instruction to disable a compression function of the compression component, and
a second instruction to copy a value from a first memory location to a second memory location in a memory coupled to the second processor;
employing, by the compression component, a direct memory access capability to access the first memory location directly;
employing, by the compression component, the direct memory access capability, to copy the value from the first memory location to the second memory location, in accordance with the second instruction; and
communicating, by the compression component, a result of the copying to the second processor.

11. The method of claim 10, wherein the instruction comprises command descriptors posted to a task queue by the host application.

12. The method of claim 10, wherein the copying the value is performed by employing a direct memory address component.

13. The method of claim 10, wherein the second processor is a component of a data protection system.

14. The method of claim 10, wherein the second processor sent the first and second instructions based on a prediction that the second instruction would be non-blocking if performed by the direct memory access capability of the compression component.

15. The method of claim 14, further comprising:
enabling, by the compression component, the compression function; and
compressing, by the compression component, data for another host application by employing the compression function.

16. A non-transitory machine-readable medium, comprising executable instructions that, when executed by a processor of a network device, facilitate performance of operations, comprising:
receiving a memory copy instruction from a host application; and
controlling a compression component to:
disable a compression function of the compression component,
employ a direct memory access capability of the compression component to access a first memory location directly, and
employ the direct memory access capability to copy a value from the first memory location to a second memory location, in accordance with the memory copy instruction.

17. The non-transitory machine-readable medium of claim 16, wherein the processor comprises a multithreaded processor that executes operations by employing threads, and wherein a first thread of the threads is dedicated to controlling the compression component.

18. The non-transitory machine-readable medium of claim 16, wherein the controlling the compression component comprises posting a descriptor to a task queue of the compression component, and wherein the compression component copies the value based on the descriptor.

19. The non-transitory machine-readable medium of claim 16, wherein the operations further comprise controlling the compression component to enable the compression function of the compression component based on an instruction to compress from another host application.

20. The non-transitory machine-readable medium of claim 16, wherein the direct memory access function of the compression component is different from a function of a direct memory access component of the network device.

* * * * *